(12) United States Patent
Frederickson et al.

(10) Patent No.: US 6,957,737 B1
(45) Date of Patent: Oct. 25, 2005

(54) PACKAGE FOR ACTIVATABLE POINT OF SALE CARDS

(75) Inventors: Daniel J. Frederickson, Hugo, MN (US); Dennis R. Smith, Minnetonka, MN (US)

(73) Assignee: UV Color, Inc., Roseville, MN (US)

( * ) Notice: Subject to any disclaimer, the term of this patent is extended or adjusted under 35 U.S.C. 154(b) by 48 days.

(21) Appl. No.: 10/621,594

(22) Filed: Jul. 17, 2003

(51) Int. Cl.[7] ........................ B65D 85/48; G06F 17/60; B42D 15/00
(52) U.S. Cl. ...................... 206/449; 235/379; 235/380; 235/487; 283/61; 283/62; 283/74
(58) Field of Search .................... 206/449; 283/61–62, 283/74, 904; 235/379–382.5, 486–487

(56) References Cited

U.S. PATENT DOCUMENTS

| | | |
|---|---|---|
| 449,973 A | 4/1891 | Smith |
| 1,381,609 A | 6/1921 | Woronzoff |
| 1,384,457 A | 7/1921 | Fetters |
| 1,729,916 A | 10/1929 | Veron |
| 2,279,164 A | 4/1942 | Gettleman |
| 2,284,586 A | 5/1942 | McDermott |
| 2,616,612 A | 11/1952 | Guttman |
| 3,069,793 A | 12/1962 | Francescon |
| 3,159,329 A | 12/1964 | Hiersteiner |
| 3,164,317 A | 1/1965 | Bogen |
| 3,461,581 A | 8/1969 | Hoffmann |
| 3,684,869 A | 8/1972 | Relter |
| 3,697,101 A | 10/1972 | Loos et al. |
| 3,716,439 A | 2/1973 | Maeda |
| 3,734,396 A | 5/1973 | Cowan |
| 3,895,220 A | 7/1975 | Nelson et al. |
| 4,051,996 A | 10/1977 | Ross et al. |
| 4,204,639 A | 5/1980 | Barber et al. |
| 4,245,035 A * | 1/1981 | Poshkus ..................... 430/496 |
| 4,520,958 A | 6/1985 | Jones et al. |
| 4,531,993 A | 7/1985 | Bradley |
| 4,589,687 A | 5/1986 | Hannon |
| 4,602,447 A | 7/1986 | Feingold |
| 4,602,737 A | 7/1986 | Lorenz |
| 4,606,555 A | 8/1986 | Adams |
| 4,617,215 A | 10/1986 | Telesco |
| 4,636,179 A | 1/1987 | Gentile et al. |
| 4,687,231 A | 8/1987 | Hartmann |
| 4,791,281 A | 12/1988 | Johnsen et al. |
| 4,795,196 A | 1/1989 | Hyun et al. |
| 4,815,768 A | 3/1989 | Applebaum et al. |
| 4,828,104 A | 5/1989 | Ribellino, Jr. |
| 4,957,311 A | 9/1990 | Geisenheimer |
| 4,978,146 A | 12/1990 | Warther et al. |
| 4,986,868 A | 1/1991 | Schmidt |
| 5,131,686 A | 7/1992 | Carlson |
| 5,173,080 A | 12/1992 | Longtin |
| 5,209,514 A | 5/1993 | Hebert |
| 5,219,183 A | 6/1993 | McKillip |
| 5,281,799 A | 1/1994 | McIntire et al. |
| 5,403,236 A | 4/1995 | Greig |
| 5,413,532 A | 5/1995 | Raby |

(Continued)

*Primary Examiner*—Bryon P. Gehman
(74) *Attorney, Agent, or Firm*—Fredrikson & Byron, PA

(57) ABSTRACT

Activatable point of sale cards in which multiple cards can be mounted on a display sheet for use in display or shipment applications. Several cards can be included in the package, with each card being associated with a unique account. The card accounts may be conveniently activated by orienting a data field on the display sheet that is associated with the accounts which can be used to activate all of the accounts in one transaction.

21 Claims, 3 Drawing Sheets

U.S. PATENT DOCUMENTS

| | | |
|---|---|---|
| 5,427,832 A | 6/1995 | Longtin |
| 5,494,544 A | 2/1996 | Hill et al. |
| 5,534,320 A | 7/1996 | Raby |
| 5,632,511 A | 5/1997 | Longtin et al. |
| 5,640,447 A | 6/1997 | Fonseca |
| 5,650,209 A | 7/1997 | Ramsburg et al. |
| 5,662,976 A | 9/1997 | Popat et al. |
| 5,667,247 A | 9/1997 | Ramsburg et al. |
| 5,673,309 A | 9/1997 | Woynoski et al. |
| 5,695,589 A | 12/1997 | German et al. |
| 5,740,915 A | 4/1998 | Williams |
| 5,760,381 A | 6/1998 | Stich et al. |
| 5,777,305 A | 7/1998 | Smith et al. |
| 5,791,474 A | 8/1998 | Hansen |
| 5,842,629 A | 12/1998 | Sprague et al. |
| 5,842,722 A | 12/1998 | Carlson |
| 5,895,074 A | 4/1999 | Chess et al. |
| 5,918,909 A | 7/1999 | Fiala et al. |
| 5,921,584 A | 7/1999 | Goade, Sr. |
| 5,958,174 A | 9/1999 | Ramsberg et al. |
| 5,975,302 A | 11/1999 | Young |
| 6,224,108 B1 * | 5/2001 | Klure ............ 283/74 |
| 6,270,012 B1 | 8/2001 | Dawson |
| 6,315,206 B1 | 11/2001 | Hansen et al. |
| 6,328,341 B2 | 12/2001 | Klure |
| 6,439,613 B2 | 8/2002 | Klure |
| 6,454,165 B1 | 9/2002 | Dawson |
| 6,457,649 B1 | 10/2002 | Hileman |
| 6,715,795 B2 * | 4/2004 | Klure ............ 283/62 |
| 6,729,656 B2 * | 5/2004 | Kubert et al. ........ 283/100 |

* cited by examiner

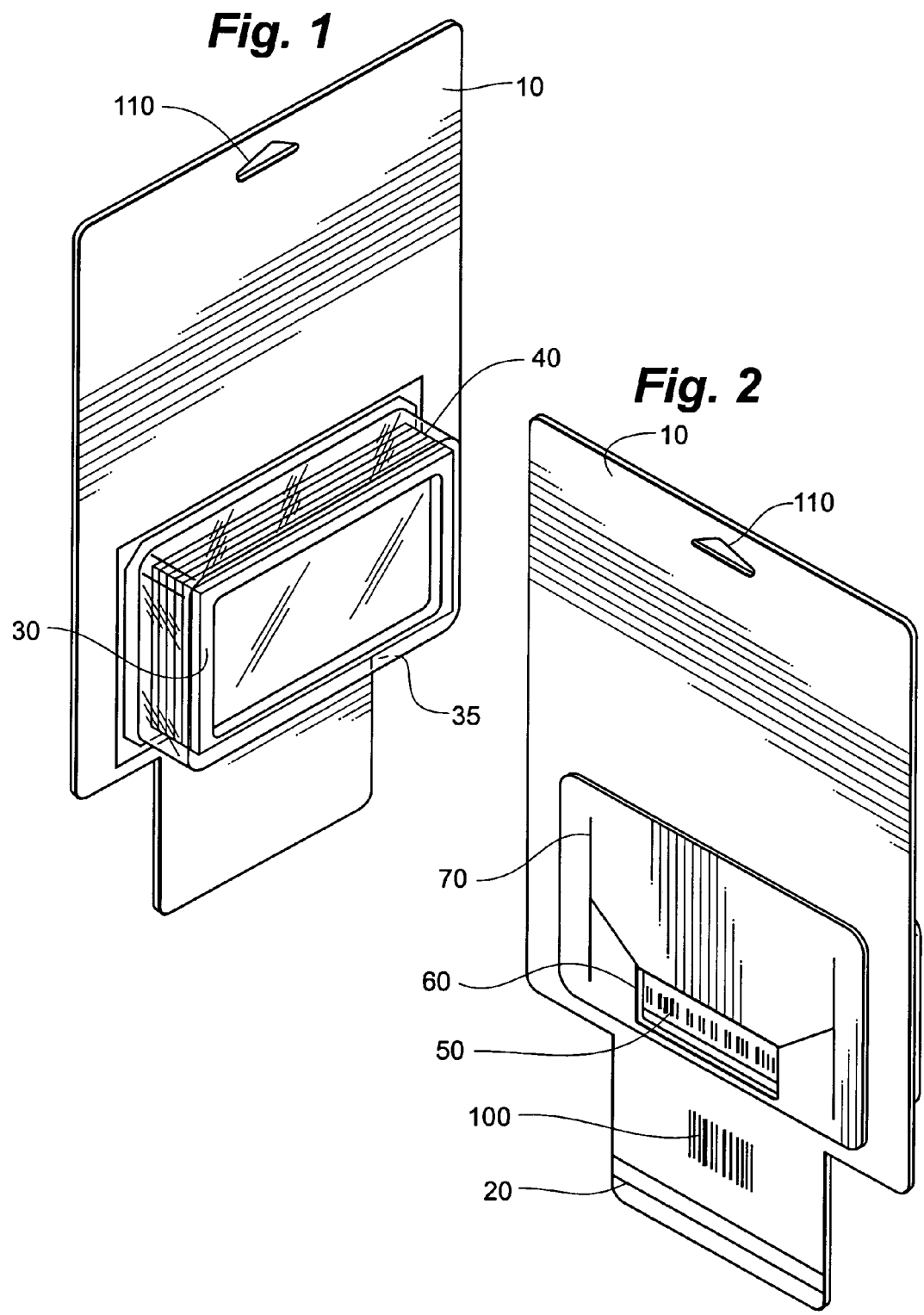

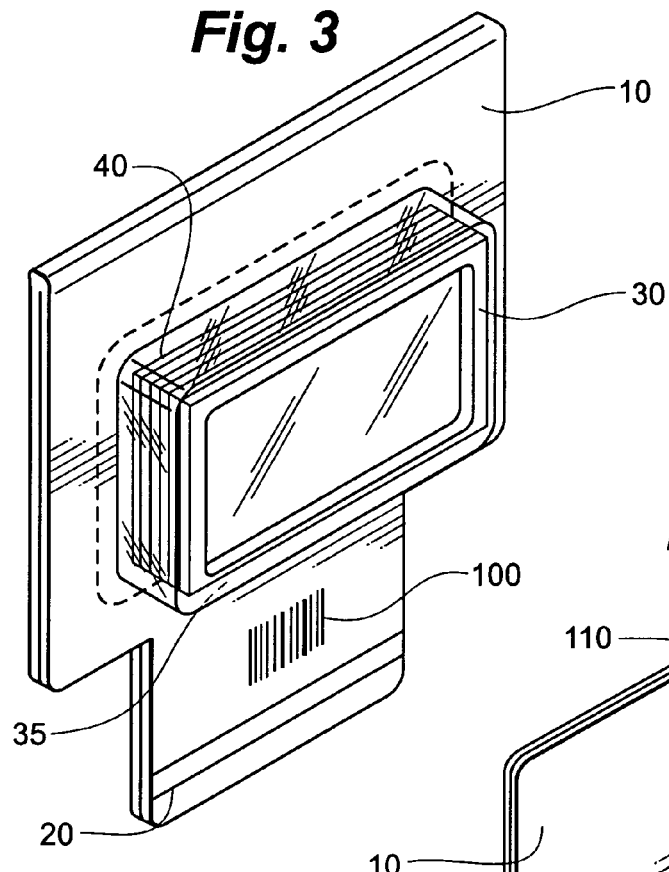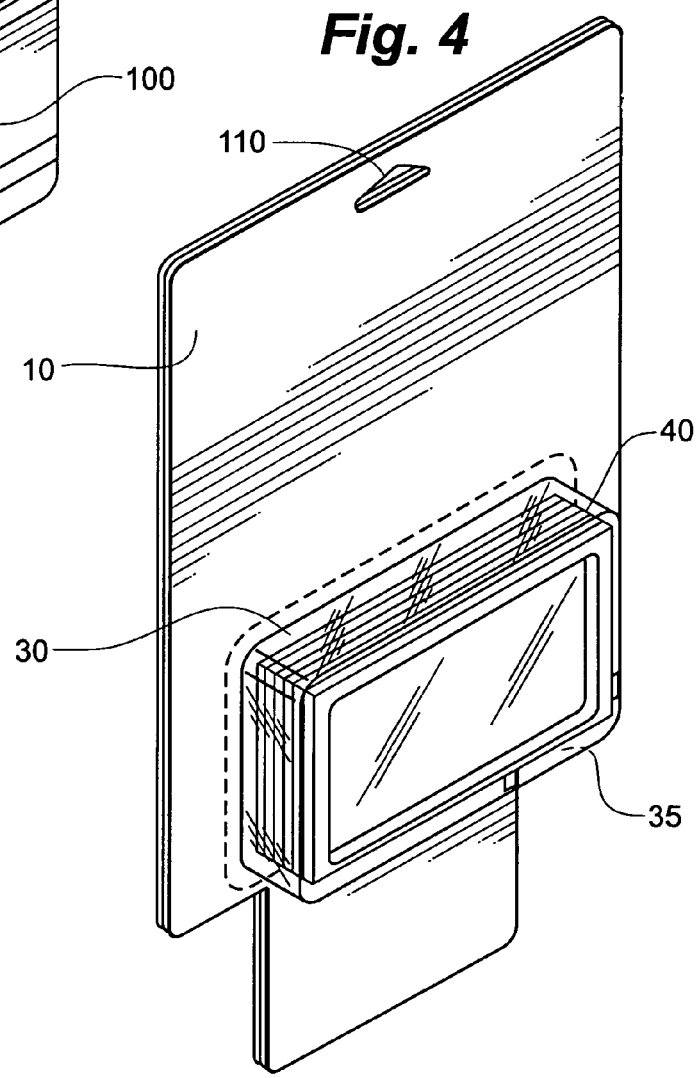

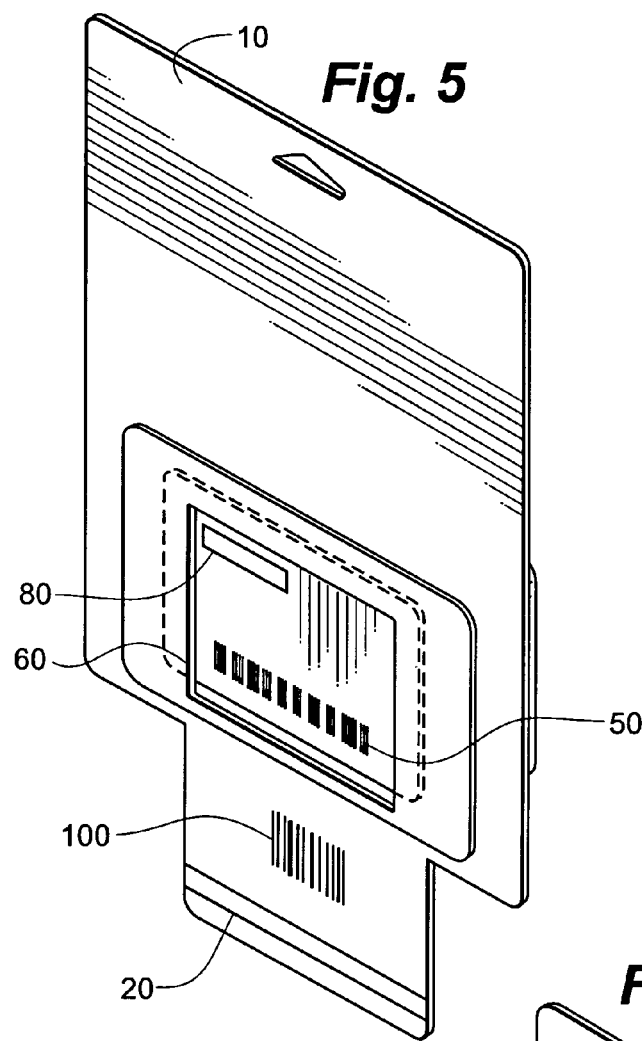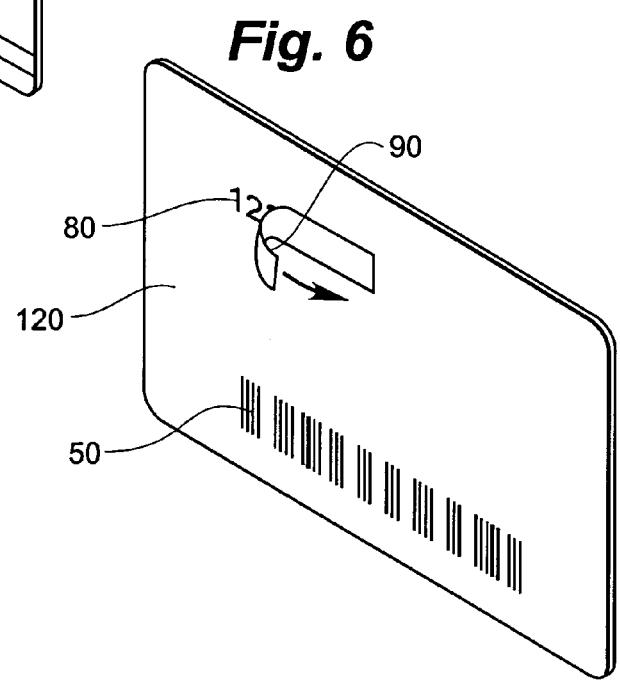

PACKAGE FOR ACTIVATABLE POINT OF SALE CARDS

FIELD OF THE INVENTION

The invention relates generally to packaging and display technology related to activatable point of sale cards.

BACKGROUND OF THE INVENTION

Within the last thirty years there has been a revolution in use of plastic, or plastic-like credit cards, debit cards and gift cards. In more recent years further developments have led to the use of such phone and credit card technologies in the field of products that are activated at the point of sale. These products are distributed to retailers in bulk and are activated by the retailers or another party upon purchase by the end user.

Before the advent of point of sale activation, such debit and gift cards were typically kept under lock and key because in their activated form they were valuable and easy to steal. With point of sale activation, the cards are now displayed freely since they are essentially valueless until activated. This has led suppliers of the cards to desire attractive packages that are easy to display, inexpensive to ship in bulk, and capable of indicating unauthorized activation.

SUMMARY OF THE INVENTION

This invention is directed toward a package assembly for holding and activating a plurality of point-of-sale debit or credit cards or other items requiring remote notification of sale. A first aspect of this invention includes a display sheet with a data field affixed to the display sheet. A covering cooperates with the display sheet to form an enclosed space. There is a plurality of cards retained in the enclosed space. Each of the cards is associated with a unique account in a database. The data field on the package may be used to activate all of the accounts associated with the cards in the package.

In one embodiment the display sheet is plastic. The covering may be affixed to the display sheet by radio-frequency welding. In another embodiment, the cards have card data printed on them and the display sheet has an aperture through it for viewing the card data on at least one of the cards. This embodiment may have one or more score lines in the display sheet near the area of the aperture to allow for removal of the cards.

In another embodiment each of the plurality of cards has a personal identification number printed on it which allows the user to access the account associated with the card. The personal identification number may be obscured by a removable covering.

Many customers want to buy several of point-of-purchase-activated cards at once. This is convenient for people who want to distribute pre-paid cards to family or friends, those who want to buy a large value of cards in one transaction but only carry a portion of that value with them at one time, and resellers such as convenience stores who want to buy several cards, activate them, and resell individual activated cards. The various embodiments of this invention provide for convenient purchase and point-of sale activation for multiple cards in one transaction with excellent security, convenience, and package attractiveness.

BRIEF DESCRIPTION OF THE DRAWINGS

FIG. 1 is a perspective view of an embodiment of the invention.

FIG. 2 is an perspective view of the reverse side of the embodiment of the invention shown in FIG. 1.

FIG. 3 is a perspective view of an embodiment of the invention.

FIG. 4 is a perspective view of an embodiment of the invention.

FIG. 5 is a perspective view of an embodiment of the invention.

FIG. 6 is a plan view of an embodiment of a card of the invention

DETAILED DESCRIPTION OF THE INVENTION

Referring to the drawings, FIG. 1 is a perspective view of a multiple card package according to an embodiment of the invention. The package includes a display sheet 10 with a covering 30 affixed to the display sheet. The display sheet 10 and the covering 30 cooperate to form an enclosed space 35 between the covering and the display sheet. A plurality of cards 40 are retained within the enclosed space. The display sheet 10 and the covering 30 may be made of any suitable materials. In one embodiment of the invention the display sheet 10 is made of plastic and the covering 30 is made of a thinner clear plastic. In this embodiment the covering 30 may be attached to the display sheet 10 using radio frequency welding. The covering 30 may, however, be attached to display sheet 10 using an adhesive, staples, or other fastener known in the art.

The sheet of material from which display sheet 10 may be manufactured may be a single plastic or plastic-like component or a laminated composite of several components. The display sheet 10 may also be made of paper stock, paper with protective laminate, or any material capable of receiving printed matter for advertising and other purposes as is well known in the art. The printing may be done using any technique known in the art. One embodiment of the display sheet 20 may be manufactured from a sheet of styrene, polyvinyl chloride, or other material. This embodiment provides for simple manufacture of the invention and creates a more durable display sheet. Durability is an important attribute since the packages may be shipped in bulk and subjected to abuse and damaging environments.

Data may be printed on the display sheet with ultraviolet ("UV") curable ink. UV curable inks may be applied directly to durable plastics such as styrene and polyvinyl chloride, among others, thus eliminating the need for protective layers of lamination or lamination used to strengthen inferior substrates. UV curable inks may be so applied because they cure quickly upon exposure to ultraviolet light. Conventional inks contain solvents that contain the pigmentation constituents. Conventional inks cure more slowly because the solvent containing the pigmentation must either evaporate into the atmosphere or be absorbed by the substrate material to which the ink is applied in order for the ink to cure.

One or both sides of the display sheet 20 may be coated with a UV curable coating that protects the printed surface. The UV curable coating may include acrylates, photoinitiators, and other polymers and monomers. This coating can add an attractive shiny or satin appearance to the product and provide some resistance to scratches or abrasions. It is also not susceptible to delaminating.

In one embodiment of the invention, generic and package specific data may be printed on one or both sides of the display sheet 10 with an inkjet system. The package specific data may include a machine-readable code, such as a bar code, magnetic strip, machine-readable optical characters, or human-readable data corresponding to the bar code, or any other machine- or human-readable printed matter. One or both sides of the display sheet 10 may be coated with a ultraviolet curable coating or other coating or laminate to protect the surface and the printing on that surface from abrasion. The display sheet may have a hole 110 through it for hanging the package on a point of sale display rack.

FIG. 2 shows a view of the reverse side of the embodiment shown in FIG. 1. A data field 20 is located on the display sheet 10. The data field 20 is shown on an extended portion of the display sheet 10, but the data field 20 could be located anywhere on the display sheet 10. The embodiment as shown is useful where the data field 20 is a magnetic strip which is read by a standard magnetic strip reading machine. The display sheet 10 may then be fabricated in a desired size for attracting the attention of consumers while the extended portion can conveniently be read by the machine. The extended portion as shown has similar dimensions to a common credit card, but there is no reason that this need be so. The display sheet 10 may be any size or shape, with or without such an extension. The data field 20 is a machine-readable collection of data. Examples include, but are not limited to, bar codes, magnetic strips, programmable chips, or machine readable optical characters.

During the package production process a plurality of cards 40 are placed in the package. Each of the cards in the plurality of cards 40 is associated with a unique account in a database. The data field 20 on the display sheet may be used to activate all of the accounts associated with each of the cards in the package.

In one embodiment of the invention the plurality of cards 40 have card data 50 printed on them. In this embodiment the display sheet may have an aperture 60 through it for viewing card data 50 on at least one of the plurality of cards 40. This embodiment may further have at least one score line 70 near the aperture to allow for removal of the plurality of cards 40 from the enclosed space. The score line 70 is a notch or incision which may or may not pass through the display sheet. Examples of score lines include perforations common in many paper and plastic products. The display sheet 10 may also have display sheet data 100 printed on it which corresponds to the data on the data strip 20.

In addition, the display sheet 10 as shown in FIG. 3 may be formed as a foldable sheet and the covering 30 may be secured therebetween when the sheet is folded. The covering 30 may have extended flanges to facilitate retention between the layers of folded sheet. The sheet may be fabricated with a score line or impression to make it easier to fold the sheet neatly. The sheet may be secured in the folded position by welding, adhesive, staples, or other fastener known in the art.

Alternatively as shown in FIG. 4, the display sheet 10 may be formed of two congruent sheets fastened together through welding, adhesive, staples, or other fastener known in the art. The covering 30 may be secured between the congruent sheets to form the enclosed space 35 as in the folded sheet embodiment of FIG. 3.

Another embodiment of the invention is shown in FIG. 5. In this embodiment of the invention each of the plurality of cards 40 have card data 50 and a personal identification number 80 (FIG. 6) printed on them. The display sheet 10 has as aperture 60 through it for viewing card data 50. The aperture 60 is large enough that the display sheet 10 does not conceal the personal identification number 80. The personal identification number 80 may be concealed by a removable covering 90 (FIG. 6) or other concealing material, but the display sheet 10 does not conceal the personal identification number 80.

Turning now to FIG. 6, one of the plurality of cards 40 is displayed. The card 120 may have a personal identification number 80 printed on it. The personal identification number 80 may be obscured by a removable covering 90. The removable covering 90 may be in the form of a hot foil stamp or a sticker affixed with glue, for example. If the removable covering 90 is disturbed to view the personal identification number 80, it is irreparably damaged so that the party responsible for activating the cards knows that the security of the personal identification number 80 has been compromised.

Unique card data 50 may also be printed on each card. The card data 50 may include a machine-readable bar code or any other machine- or human-readable printing. The card data 50 and/or the personal identification number 80 of each card in the package may be correlated to unique accounts in a database operated by an underlying supplier of goods and services. During production, the cards 120 may be associated with and placed in a package formed by a display sheet 10 and a covering 30. The card data is also associated in the database with the data from the data field 20 on the display sheet 10 with which the plurality of cards 40 are associated.

During the production of the packages, each display sheet is assigned a unique identifier which is represented in the data field 20 and the display sheet data 100. Each card 120 is associated with a unique identifier which is represented in the card data 50. The card data 50 for each card is uniquely associated with a metered account in a database. Each card is also given a personal identification number 80 which is correlated with the same account as the card data 50. The unique identifier of the display sheet which is represented in the data field 20 and the display sheet data 100 is associated in the database with the accounts associated with the plurality of cards 40 enclosed between the covering 30 and the display sheet 10. Once the plurality of cards 40 are enclosed between the display sheet 10 and the covering 30, the card data 50 on the card closest to the display sheet is read through the aperture 60 to ensure that the proper cards 40 are in the package.

When the end user purchases the package, the package seller electronically reads the unique code from the data field 20 on the display sheet or manually enters the unique package code into a computer. The seller then transmits the code to the database of the underlying supplier. The underlying supplier of the goods and services then activates each account which is associated with each card 120 in the activated package to allow the end user to redeem the stored value of the cards for goods and services. As the end user redeems the value associated with each card, the underlying supplier debits each account in its database until its value is exhausted.

While exemplary embodiments of this invention have been illustrated and described, it should be understood that various changes, adaptations, and modifications may be made therein without departing from the spirit of the invention and the scope of the appended claims.

What is claimed is:

1. A package assembly comprising;
   a) a display sheet and a data field affixed to the display sheet;
   b) a covering which cooperates with the display sheet to form an enclosed space;
   c) a plurality of cards retained within the enclosed space;
   d) wherein each of the plurality of cards is uniquely associated with one of a plurality of accounts in a database; and
   e) wherein the data field on the display sheet contains data that can activate all of the plurality of accounts associated with the plurality of cards.

2. The package assembly of claim 1, wherein the display sheet is plastic.

3. The package assembly of claim 2, wherein the covering is affixed to the display sheet by radio-frequency welding.

4. The package assembly of claim 1, wherein the display sheet is formed from a sheet of material which is folded upon itself to form a multilayer display sheet.

5. The package assembly of claim 1, wherein the display sheet is formed from a plurality of sheets of material congruently affixed to one another.

6. The package assembly of claim 1, wherein the data field is a magnetic strip.

7. The package assembly of claim 1, wherein the display sheet has a generally rectangular perimeter and a portion extending from the perimeter across which the data field is affixed.

8. The package assembly of claim 1, wherein each of the plurality of cards have card data printed on them.

9. The package assembly of claim 8, wherein the display sheet has an aperture through it for viewing card data on at least one of the plurality of cards.

10. The package assembly of claim 9, wherein the display sheet has at least one score line near the aperture to allow for removal of the plurality of cards.

11. The package assembly of claim 1, wherein each of the plurality of cards has a personal identification number printed on it which allows the user to access the account associated with that card.

12. The package assembly of claim 11, wherein the personal identification number is obscured by a removable covering.

13. The package assembly of claim 1, wherein the display sheet has data printed on it corresponding to the data of the data field.

14. The package assembly of claim 1, wherein each of the plurality of cards has a personal identification number printed on it which allows the user to access the account associated with that card; and
   a) wherein the personal identification number is on the side of each of the plurality of cards nearest the display sheet when retained within the enclosed space;
   b) and wherein an aperture through the display sheet prevents the display sheet from concealing the personal identification number of at least one of the cards.

15. The package assembly of claim 14, wherein the personal identification number is obscured by a removable covering.

16. A package assembly comprising:
   a) a display sheet formed of a single sheet of plastic material with generic and/or package-specific data printed on at least one side of the display sheet;
   b) an ultraviolet-curable coating on at least one side of the display sheet;
   c) data field affixed to the display sheet containing data uniquely identifying the display sheet;
   d) a covering which cooperates with the display sheet so as to form an enclosed space;
   e) a plurality of cards retained in the enclosed space, each card having a personal identification number printed on it and each of the plurality of cards being uniquely associated with one of a plurality of accounts in a database, wherein the personal identification number is obscured by a removable covering and wherein the data field contains data that can activate all of the plurality of accounts associated with the plurality of cards.

17. The package assembly of claim 16, wherein the covering is affixed to the display sheet by radio-frequency welding.

18. The package assembly of claim 16, wherein the display sheet has a hole through it for hanging on a point-of-sale display rack.

19. The package assembly of claim 16, wherein each of the plurality of cards have card data printed on them.

20. The package assembly of claim 19, wherein the display sheet has an aperture through it for viewing card data on at least one of the plurality of cards.

21. A process for activating a plurality of cards comprising:
   a) passing a display sheet through a data field reader which reads data from a data field that is affixed to the display sheet; wherein there is a covering which cooperates with the display sheet to form an enclosed space, and a plurality of cards retained within the enclosed space; wherein each of the plurality of cards is uniquely associated with one of a plurality of accounts in a database and the data field contains data that can activate all of the plurality of accounts associated with the plurality of cards;
   b) activating the plurality of cards by transmitting data from the data field to a computer which monitors metered accounts so that the computer can credit the accounts associated with each of the cards in an appropriate amount.

* * * * *